(12) United States Patent
Kretschmer et al.

(10) Patent No.: US 9,919,609 B2
(45) Date of Patent: Mar. 20, 2018

(54) CHARGING PLUG, CHARGING CABLE AND CHARGING METHOD FOR AN ELECTRIC VEHICLE

(71) Applicant: Dr. Ing. h.c. F. Porsche Aktiengesellschaft, Stuttgart (DE)

(72) Inventors: Horst Kretschmer, Leutenbach (DE); Frank Dambacher, Renningen (DE); Thomas Krauss, Reutlingen (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 144 days.

(21) Appl. No.: 14/817,567

(22) Filed: Aug. 4, 2015

(65) Prior Publication Data

US 2016/0039297 A1  Feb. 11, 2016

(30) Foreign Application Priority Data

Aug. 8, 2014 (DE) .................. 10 2014 111 334

(51) Int. Cl.
| | | |
|---|---|---|
| *H02J 7/00* | (2006.01) | |
| *H02J 7/04* | (2006.01) | |
| *H02J 7/16* | (2006.01) | |
| *B60L 11/18* | (2006.01) | |
| *G01D 5/14* | (2006.01) | |
| *G01K 13/00* | (2006.01) | |
| *H01R 13/66* | (2006.01) | |

(52) U.S. Cl.
CPC ....... *B60L 11/1818* (2013.01); *B60L 11/1838* (2013.01); *G01D 5/142* (2013.01); *G01K 13/00* (2013.01); *H01R 13/6683* (2013.01); *H01R 2201/26* (2013.01)

(58) Field of Classification Search
CPC .................................... B60L 11/1818
USPC ........................................... 320/109
See application file for complete search history.

(56) References Cited

U.S. PATENT DOCUMENTS

| | | | |
|---|---|---|---|
| 6,905,362 B2 | 6/2005 | Williams | |
| 8,573,994 B2 | 11/2013 | Kiko et al. | |
| 8,729,856 B2 | 5/2014 | Nathan et al. | |
| 9,293,871 B2 | 3/2016 | Valadas | |
| 2009/0251832 A1 | 10/2009 | Brugner et al. | |
| 2013/0134933 A1* | 5/2013 | Drew .................. | H02H 5/04 320/109 |

(Continued)

FOREIGN PATENT DOCUMENTS

| | | |
|---|---|---|
| DE | 20 2008 009 929 | 1/2010 |
| DE | 10 2012 107 902 | 3/2014 |

(Continued)

OTHER PUBLICATIONS

Japanese Office Action dated Jun. 29, 2016.
German Search Report dated Jul. 7, 2015.

*Primary Examiner* — Edward Tso
*Assistant Examiner* — Ahmed Omar
(74) *Attorney, Agent, or Firm* — Gerald E. Hespos; Michael J. Porco; Matthew T. Hespos

(57) ABSTRACT

A charging plug (10) for an electric vehicle having has contact pins (L1, N, PE) for establishing a plug connection to a coupling, and temperature sensors (NTC1, NTC2, NTC3) that are coupled thermally to the contact pins (L1, N, PE) for detecting a temperature profile between the charging plug (10) and the coupling.

14 Claims, 4 Drawing Sheets

(56) References Cited

U.S. PATENT DOCUMENTS

| | | | |
|---|---|---|---|
| 2013/0162053 A1* | 6/2013 | Iizuka | H01H 47/00 |
| | | | 307/140 |
| 2014/0073189 A1 | 3/2014 | Kondou et al. | |
| 2014/0162491 A1 | 6/2014 | Valadas | |
| 2015/0303737 A1 | 10/2015 | Steinbuchel, IV | |
| 2017/0237205 A1* | 8/2017 | Fuehrer | B60L 3/0023 |
| | | | 439/620.22 |

FOREIGN PATENT DOCUMENTS

| | | | | |
|---|---|---|---|---|
| DE | 112012002735 T5 | | 3/2014 | |
| JP | 2002352635 A | | 12/2002 | |
| JP | 2014518440 A | | 7/2014 | |
| WO | 02/13330 | | 2/2002 | |
| WO | WO2014/036013 | * | 8/2013 | H02M 7/04 |
| WO | 2014036013 A2 | | 3/2014 | |
| WO | 2014/208654 | | 12/2014 | |

\* cited by examiner

CHARGING PLUG, CHARGING CABLE AND CHARGING METHOD FOR AN ELECTRIC VEHICLE

CROSS REFERENCE TO RELATED APPLICATION

This application claims priority under 35 USC 119 to German Patent Appl. No. 10 2014 111 334.9 filed on Aug. 8, 2014, the entire disclosure of which is incorporated herein by reference.

BACKGROUND

1. Field of the Invention.

The invention relates to a charging plug for an electric vehicle, a charging cable having such a plug, and a method for charging an electric vehicle.

2. Description of the Related Art.

Vehicles with a battery that can be charged by a public power supply system are known in the field of electromobility. A large number of power supply systems, charging plugs and charging cables are in use worldwide for this purpose and satisfy an extremely wide variety of quality standards and are subject to ageing influences. An extremely wide variety of demands also are made on the use of this infrastructure.

U.S. Pat. Nos. 6,905,362, 8,729,856 and 8,573,994 have proposed equipping charging plugs with temperature sensors to be able to reduce or disconnect the charging current as required to avoid overloading the infrastructure components during charging.

U.S. Pat. No. 8,573,994 and DE 20 2008 009 929 U1 disclose attempts to use a Hall sensor to check the correct fitting of the charging plug in the coupling or bushing. DE 20 2008 009 929 U1 discloses a charging plug apparatus for motor vehicles having an electric drive comprising a plug part, a socket part and a Hall sensor which, when the charging plug apparatus is connected, delivers a different voltage than when the plug apparatus is not connected.

SUMMARY

The invention relates to a method and apparatus for detecting the temperature profile directly between the charging bushing or coupling and the charging plug during the charging process. Imminent overheating of the plug connection in the event of improper use of the charging cable can therefore be identified in good time and avoided by disconnecting the charging plug or reducing the current.

The apparatus may comprise a printed circuit board that faces the charging bushing. Temperature sensors and a Hall sensor carried by the printed circuit board can be provided for checking the plug connection. Therefore, the electrical supply system connection required for charging can be checked for fundamental compatibility of the two plug parts even before the actual charging process. A variety of elements, for example NTC elements, PTC elements or thermistors are suitable as temperature sensors.

Thermally conductive contact areas may be provided on the printed circuit board and may be connected directly to the contact pins for coupling the temperature sensors to the contact pins. Therefore, the printed circuit board simultaneously functions as a mounting platform, connection, wiring and contact point for the temperature and Hall sensors. In addition, further components can be mounted on the printed circuit board for connecting the charging plug in a protected manner.

The charging plug may be connected by electrical signal lines to a so-called in-cable control box (in-cable control and protective device). The in-cable control box can use the common signal lines to activate both the Hall sensor and the temperature sensors.

A further temperature sensor may be set away from the contact pins for detecting an environment-related temperature influence on the charging plug. The proposed geometric arrangement may be on a protective conductor contact part of the charging plug. The contact part may be connected electrically to one of the contact pins and allows, in combination with the sensors that are on the power contact pins, measurement and evaluation of the temperature from the inoperative state and environmental influences, such as sun, or ambient temperature in comparison to the temperature profile to be carried out during a charging process.

A prespecified electrical resistance of at least one of the signal lines for encoding a thermal behavior of the charging plug allows an extremely wide variety of plug and housing variants to be used. In each case different thermal behavior of the variants and corresponding characteristic curves can be stored in the charging electronics and assigned to allow power reduction processes or disconnection processes derived therefrom to be initiated.

One exemplary embodiment of the invention is illustrated in the drawings and will be described in detail in the text that follows.

DETAILED DESCRIPTION

Figure 1:
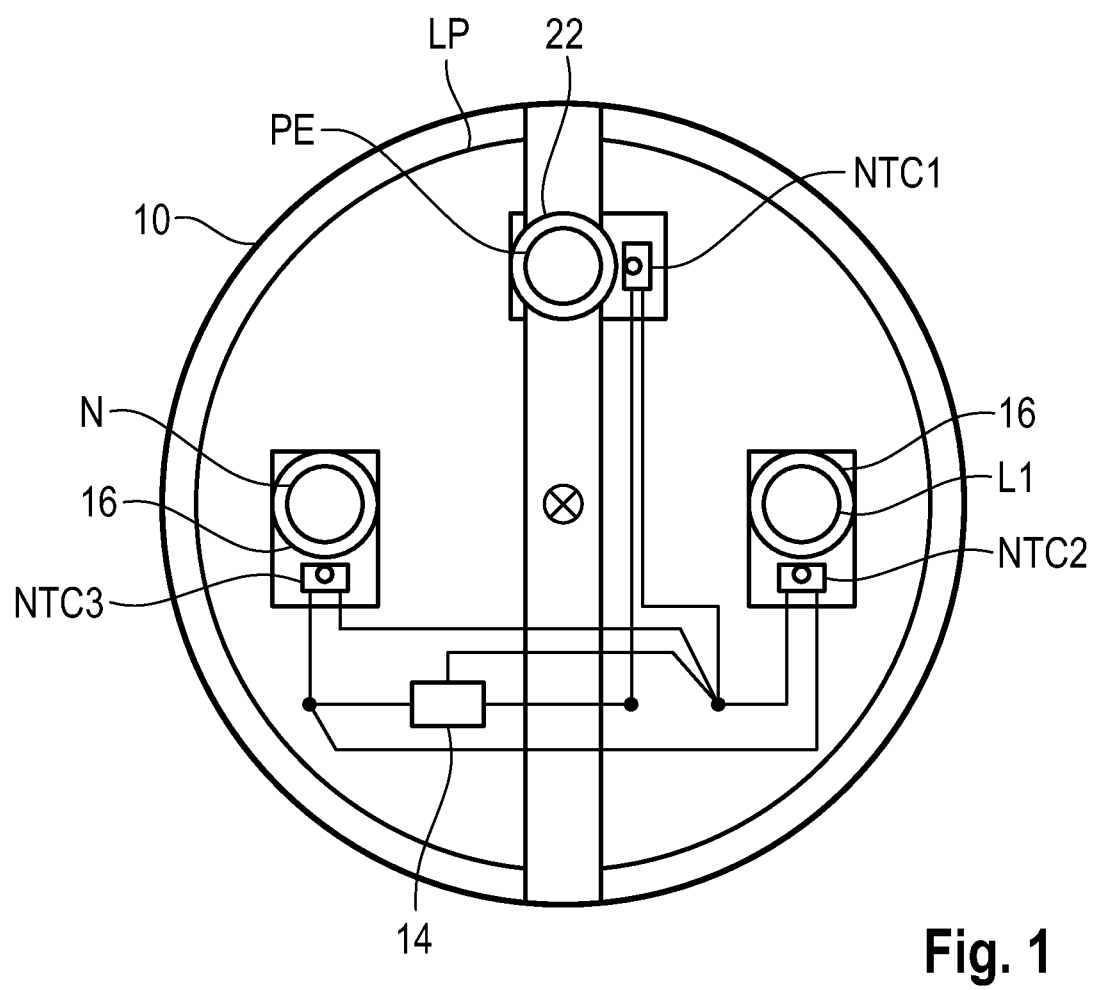
FIG. 1 shows a charging plug provided on a charging cable according to the invention, with a plan view of the printed circuit board of the charging plug.

FIG. 1 is a front view of a charging plug 10 according to the invention. The charging plug 10 has contact pins L1, N, PE for establishing a plug connection to the corresponding coupling 12 and also has temperature sensors NTC1, NTC2, NTC3 that are coupled thermally to the contact pins L1, N, PE. The temperature sensors NTC1, NTC2, NTC3 are used by an in-cable control box ICCPD, not illustrated in FIG. 1, during the charging process to detect the temperature profile between the charging plug 10 and the coupling, not illustrated in FIG. 1, of said charging plug.

The printed circuit board LP faces the viewer of FIG. 1 and functions as a mounting platform for the temperature sensors NTC1, NTC2, NTC3 and at the same time carries a Hall sensor 14 for checking the plug connection between the charging plug 10 and the coupling. Thermally conductive contact areas 16 of the printed circuit board LP fully enclose the contact pins L1, N, PE and, by virtue of their direct connection to the contact pins L1, N, PE, ensure that the contact pins are coupled thermally to the temperature sensors NTC1, NTC2, NTC3.

Further components (not illustrated) can be mounted on the printed circuit board LP to realize connection of the plug connector 10 in a protected manner.

Figure 2:
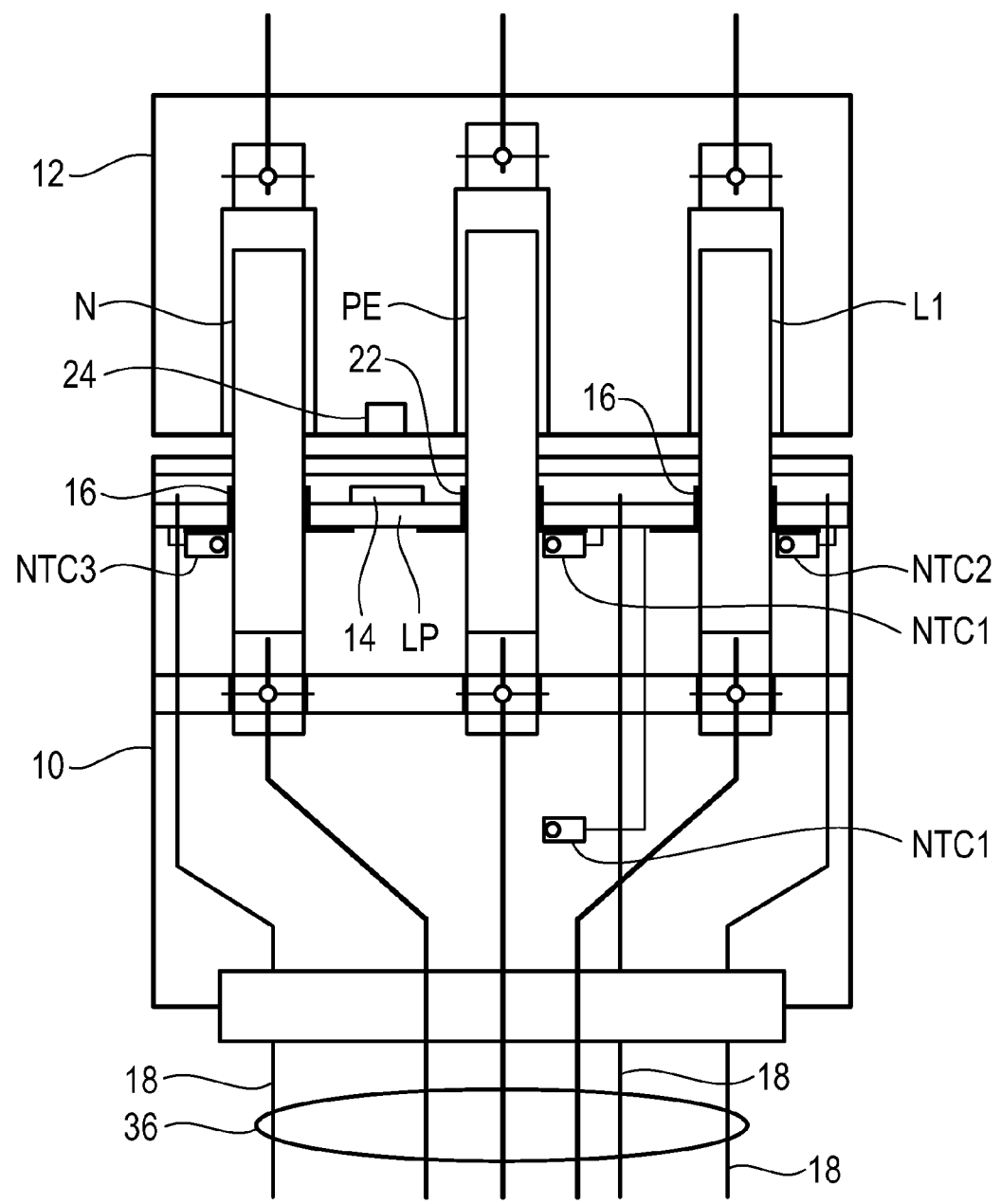
FIG. 2 is a longitudinal section through the charging plug of FIG. 1 in conjunction with a corresponding coupling or supply system plug socket.

The longitudinal section of FIG. 2 illustrates a relative arrangement of the Hall sensor 14 of the charging plug 10 in relation to a corresponding magnet 24 beneath the mating surface of the coupling 12 or supply system plug socket when the contact pins L1, N, PE of the charging plug 10 engage in corresponding contact openings in the coupling 12. FIG. 2 also shows the alternative position of the temperature sensor NTC1 that is set away from the contact pins L1, N, PE in the housing interior of the charging plug 10 and can be arranged on a protective conductor contact part 22, which is connected to the corresponding contact pin PE.

Figure 3:
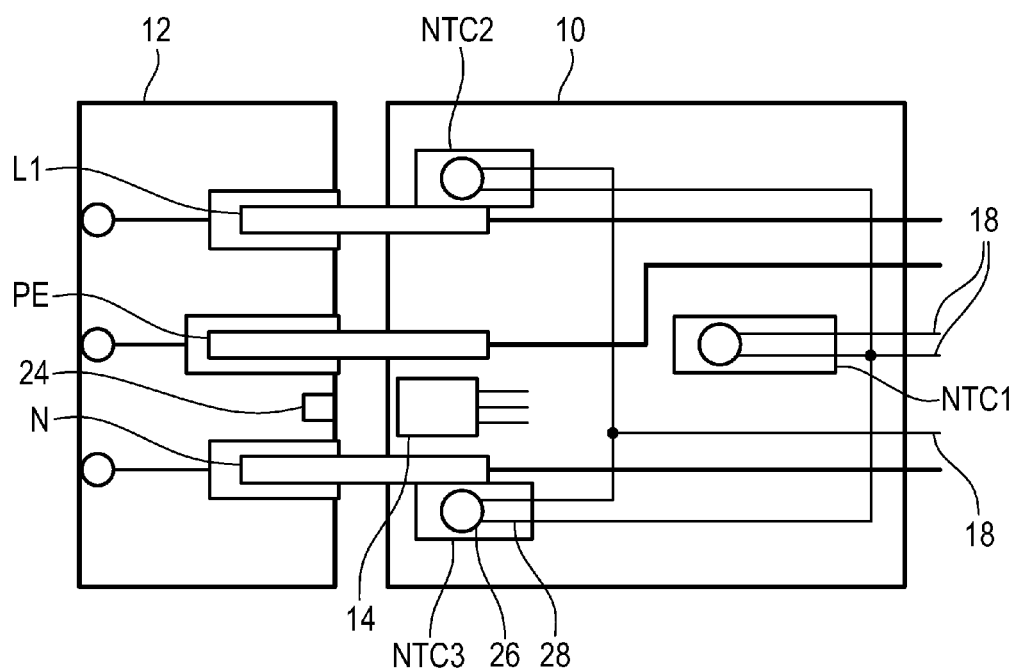
FIG. 3 is a longitudinal section that corresponds to FIG. 2, highlighting the temperature sensors of the charging plug.
Figure 5:
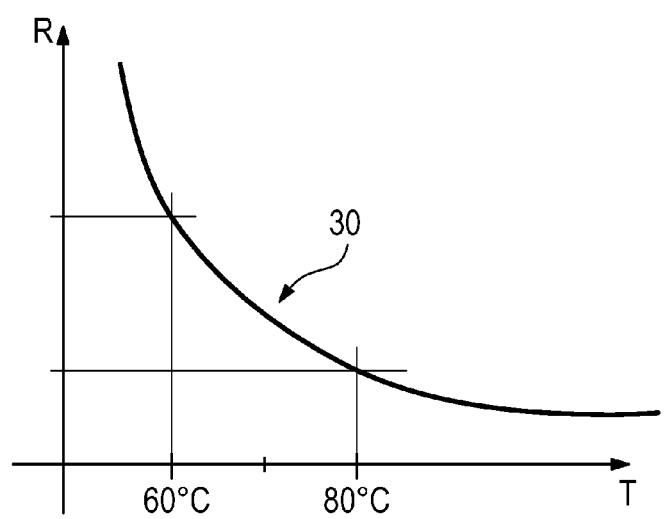
FIG. 5 shows an optimum characteristic curve of the negative temperature coefficient or NTC resistors which form the basis of the temperature sensors.

In contrast, FIG. 3 highlights, using the example of temperature sensor NTC3, the specific design of the temperature sensors NTC1, NTC2, NTC3 that, as negative temperature coefficient resistors or NTC resistors, comprise a so-called NTC pill 26 together with corresponding contact lugs 28 that are packed into a thermally conductive and electrically insulating housing made of glass, ceramic or similar material and are connected in an interlocking manner to the associated contact pin L1, N, PE by means of the housing. This together with FIG. 5 produces a particularly suitable characteristic curve 30 that shows the specific resistance R of each temperature sensor NTC1, NTC2, NTC3 as a function of the temperature T at the corresponding contact pin L1, N, PE.

Figure 4:
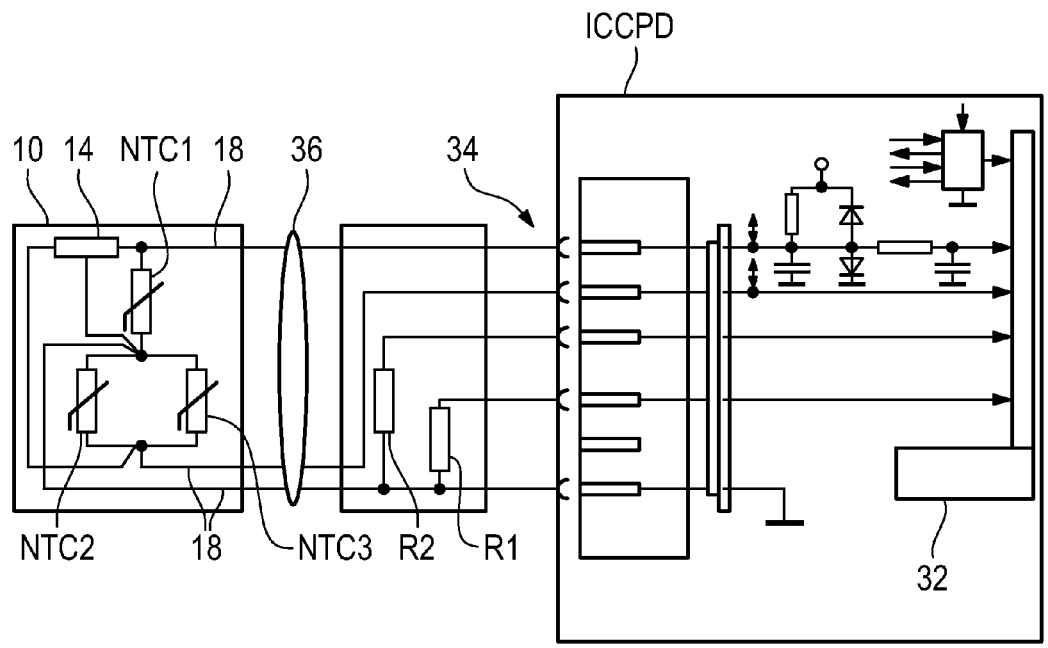
FIG. 4 is a simplified circuit diagram of the charging plug of FIG. 3 together with the charging cable and also the in-cable control box of the charging cable.

The interaction between the charging plug 10 of FIG. 3 and the charging cable 36 (illustrated schematically) that encloses the charging plug, and the in-cable control box ICCPD of the charging cable is shown in FIG. 4. To this end, the in-cable control box ICCPD, which controls the charging process, is connected to the charging plug 10 by a six-pole signal ring 34 using suitable electrical signal lines 18 that also activate the Hall sensor 14 and the temperature sensors NTC1, NTC2, NTC3. Two of said signal lines 18 have prespecified electrical resistances R1, R2 for encoding the thermal behavior of the charging plug 10, the values of the electrical resistances being correlated with the memory of a microcontroller 32 of the in-cable control box ICCPD and this therefore permitting conclusions to be drawn about the thermal behavior of the charging plug 10.

What is claimed is:

1. A charging plug for an electric vehicle, comprising:
   a printed circuit board having a first surface that faces a coupling of the electric vehicle during a charging process and a second surface that faces away from the coupling of the electric vehicle during the charging process;
   first, second, and third contact pins for establishing a plug connection with the coupling of the electric vehicle;
   first, second, and third temperature sensors mounted on the second surface of the printed circuit board and being thermally coupled to the first, second, and third contact pins, respectively, the temperature sensors configured for detecting a temperature profile between the charging plug and the coupling of the electric vehicle; and
   a Hall sensor mounted on the first surface of the printed circuit board for checking whether the plug connection with the coupling of the electric vehicle has been established.

2. The charging plug of claim 1, further comprising thermally conductive contact areas positioned on the printed circuit board and directly connected to the contact pins, the thermally conductive contact areas configured for coupling the first, second, and third temperature sensors to the first, second, and third contact pins.

3. The charging plug of claim 2, further comprising additional components that are mounted on the printed circuit board for connection of the charging plug in a protected manner.

4. The charging plug of claim 1, further comprising an in-cable control box for activating the Hall sensor and the temperature sensors by way of common electrical signal lines.

5. The charging plug of claim 1, comprising a fourth temperature sensor set away from the first, second, and third contact pins for detecting an environment-related temperature influence on the charging plug.

6. The charging plug of claim 1, further comprising a protective conductor contact part that is connected electrically to the third contact pin and that supports the third temperature sensor.

7. A charging cable for an electric vehicle comprising the charging plug of claim 4, wherein the in-cable control box is connected electrically to the charging plug by way of the signal lines for controlling a method for charging the electric vehicle.

8. The charging cable of claim 7, wherein at least one of the signal lines has a prespecified electrical resistance for encoding a thermal behavior of the charging plug.

9. A method for charging an electric vehicle, the method comprising:
   providing a charging plug having a printed circuit board, a plurality of contact pins, a plurality of temperature sensors, and a Hall sensor, the temperature sensors being mounted on a first surface of the printed circuit board, the Hall sensor being mounted on a second surface of the printed circuit board, the second surface facing a coupling of the electric vehicle during a charging process, wherein the plurality of contact pins are configured for establishing a plug connection with the coupling of the electric vehicle, wherein the plurality of temperature sensors are thermally coupled to the contact pins for detecting a temperature profile between the charging plug and the coupling of the electric vehicle during the charging process, and wherein the Hall sensor is configured for checking whether the plug connection has been established;
   plugging the contact pins into corresponding electrical contacts of the coupling of the electric vehicle for establishing the plug connection;
   activating the Hall sensor by means of signal lines to allow the Hall sensor to check whether the plug connection has been established; and
   activating the temperature sensors by means of the signal lines to allow the temperature sensors to detect the temperature profile between the charging plug and the coupling of the electric vehicle during the charging process.

10. The method of claim 9, further comprising:
    providing thermally conductive contact areas on the printed circuit board in direct connection with the contact pins: and
    utilizing the thermally conductive contact areas to couple the temperature sensors to the contact pins.

11. The method of claim 9, further comprising:
providing protective components on the printed circuit board; and
utilizing the protective components to allow the charging plug to be connected to the coupling of the electric vehicle in a protected manner.

12. The method of claim 9, further comprising:
providing an in-cable control box on the printed circuit board; and
utilizing the in-cable control box for activating the Hall sensor and the temperature sensors by means of the signal lines.

13. The method of claim 9, further comprising:
positioning an additional temperature sensor remote from the plurality of contact pins; and
utilizing the additional temperature sensor for detecting an environment-related temperature.

14. The method of claim 9, further comprising:
connecting a protective conductor contact part to one of the contact pins; and
supporting one of the temperature sensors on the protective conductor contact part.

\* \* \* \* \*